Patented Aug. 30, 1949

2,480,592

UNITED STATES PATENT OFFICE 2,480,592

ORGANIC SULFONATES AND METHOD OF MAKING SAME

Joseph Edward Mitchell, East Rutherford, N. J., assignor to Colgate-Palmolive-Peet Company, Jersey City, N. J., a corporation of Delaware No Drawing. Continuation of application Serial No. 307,257, December 2, 1939. This application November 13, 1946, Serial No. 709,437

12 Claims. (Cl. 260—505)

This invention relates to certain improved chemical compositions and to a method of their preparation and purification. More particularly, the invention is directed to the preparation of organic sulphonate detergents of improved physical and chemical properties. This application is a continuation of application Ser. No. 307,257, filed on December 2, 1939, now abandoned.

The improved compositions may be generally described as sulphonation products of certain specially prepared portions of mineral oils or other organic materials. The products are particularly useful as derging, wetting, foaming, frothing or emulsifying agents and, in general, as modifiers of capillary action and of surface tension, serving as flotation agents, as household detergents, as industrial emulsifying agents and as agents for may other purposes. They are particularly desirable for textile and other fabric treatments since they do not cause unsightly discoloration of the material under treatment.

Various methods have been described by which inexpensive sulphuric acid-mineral oil reaction products of relatively high purity and effectiveness for the purposes mentioned may be produced, among which particularly desirable products have been prepared from mineral oil extracts. However, the sulphonated products prepared by many of these prior art processes were dark in color, of poor quality and unsatisfactory for most uses. Furthermore, the ordinary sulphonates of mineral oils, even though they appear, when dissolved in water, to give clear solutions, may contain relatively large quantities of unreacted oil and undesirable side reaction products such as resins, polymerized hydrocarbons, coloring matter, oil-soluble sulphonic acids, thio compounds and other materials that may be dark colored and/or malodorous and unstable. Many of these undesirable side reaction products are highly objectionable in the finished products, as they prevent or hinder detersive action, rapid wetting-out and rapid solubility, and particularly because they are the cause of stickiness in hand washing and of a yellow staining or coloring of goods washed therewith. Certain improvements in these products and prior art processes have now been discovered, and these improvements comprise the present invention.

By the process of this invention, it has been found that, despite the numerous reactions that may occur when mineral oil, its fractions or its extracts are treated with sulphonating agents, a vastly superior material from a consideration of color, odor, derging efficiency, emulsifying properties and the like can be produced by employing the present described pretreatment of the organic material before sulphonation.

According to this invention, it is possible to obtain the desired sulphonation product with a minimum of side reactions by contacting a mineral oil extract with an amphoteric metal halide, particularly stannic chloride, with or without a solvent, to remove or to modify the properties of the unstable bodies therein before or during the contacting of the material with a sulphonating agent. It is believed that the addition of an acid reacting metal halide to a mineral oil extract prior to sulphonation effects a change in the unstable materials in the extract. These materials may be removed from the extract along with most of the metal halide by decanting, centrifuging or filtering, with or without the aid of materials of the type of silica gel, filter clay, and adsorbent carbon. The presence of a solvent such as hexane, petroleum ether or gasoline aids in the separation of the undesirable bodies.

It has also been found that it is not always necessary to remove the amphoteric metal halide from the material to be sulphonated. In fact, it has been discovered that these agents exert a very beneficial and unusual action in the sulphonation process. With these materials present during the sulphonation reaction the tendency to form products of inferior color, odor, and other physical and chemical properties is minimized. The formation of undesirable by-products is prevented by sulphonation in the presence of these metal halides, even, in many cases, without previous separation of the unstable bodies in the extract or other material being sulphonated.

It is also within the scope of this invention to treat the oil, preferably an extract, with a metal such as zinc, and an acid, such as hydrochloric acid, thereby generating hydrogen in an active state which serves to at least partially saturate or stabilize some of the more reactive and relatively unstable bodies in the mineral oil, or its extracts. This treatment, when hydrohalide acids are used in conjunction with certain of the polyvalent metals, will generate amphoteric metal halides in situ and thus act in a plural capacity of purification.

This hydrogenation may be accomplished also by use of other acids such as sulphuric acid; by use of caustic alkali on certain metals or alloys such as aluminum; or by direct hydrogen gas treatment with or without pressure, elevated temperature, and/or catalysts such as activated nickel. It is not absolutely essential to employ both the hydrogenation treatment and the amphoteric metal halide treatment but a combination of both these treatments produces superior products.

By variations of this process of hydrogenation it is apparent that one can also simultaneously include alkali treatment, or acid treatment with or without treatment with an amphoteric metal halide.

In the preferred process of this invention the pretreated mineral oil extract is treated for a short time, that is for about five to fifteen minutes, with a sulphonating agent at a low temperature in the presence of an amphoteric metal halide and in solution in a solvent comprising as a major constituent liquid sulphur dioxide with or without other solvents such as chloroform, carbon tetrachloride, dichlorethane, trichlorethylene ethane, butane, pentane, petroleum ether, ethylene, ehyl ether, dioxane, dichlor-difluormethane, carbon dioxide, and mixtures thereof. It is advantageous for the rapid sulphonation of the mineral oil extract also to admix the sulphonating agent, such as fuming sulphuric acid, with liquid sulphur dioxide before treatment of the mineral oil extract solution with said sulphonating agent. The metal halide is preferably present during the sulphonation and may be added to the reaction mixture and/or be left in the extract from a pretreatment thereof.

As a starting material any mineral oil or raw distillate therefrom may be used, but it is preferred to employ a distillate from what is generally known as a naphthene base crude, such as a Texas Gulf Coast or California crude, as distinguished from a paraffin base crude, such as a Pennsylvania crude. It has been found that the lower viscosity raw distillates are, in general, to be desired.

The first step in the preferred process is an extraction of the mineral oil or distillate to be used, with a selective solvent such as liquid sulphur dioxide, liquid sulphur dioxide plus benzol, furfural, phenol, nitrobenzene, dichlorethyl ether, a propane-cresylic acid mixture, or the like. This operation yields a hydrocarbon oil extract which is characterized by high specific gravity in comparison with the starting oil, extremely low viscosity index, high Conradson carbon, and a high degree of unsaturation. This extract is usually composed of the more aromatic and unsaturated hydrocarbons constituting the original oil. In general, repeated extractions of the same oil will yield additional extract, but the extract so obtained is not quite so satisfactory for the present purposes as the extracts obtained by less exhaustive extraction. It is also possibe to re-extract the extract with the same or different solvent. It has been found that the extracted hydrocarbon material most desirable for the present process is that which is readily soluble in liquid sulphur dioxide at low temperatures, as for instance, at 0° C. or even lower.

The hydrocarbon oil extract obtained by the above processes may then be treated with the amphoteric metal halide, preferably stannic chloride, in order to remove or to combine those bodies which cause undesirable side reactions and/or great discoloration of the materials washed by the final products. The treatment may be conducted in solvent such as liquid sulphur dioxide or gasoline to facilitate separation of the undesirable constituents.

Considerable improvement in the final products can be effected by additional processing of the material to be sulphonated, either before or after the extraction and/or by carrying out the extraction under particular conditions. The further processing may comprise further narrowing of the boiling range of the portion of the oil to be sulphonated, either by additional fractionation of the material after solvent extraction before or after the present novel pretreatment, or by additional or more specific fractionation prior to extraction. It may also comprise treatment of the material to be used for sulphonation, with caustic soda to remove certain undesirable acidic constituents, treatment with acid such as sulphuric acid to remove asphalt-like and highly reactive bodies and water, and treatment with contact clay, silica gel or adsorbent carbon to assist in the removal of resinous and tarry material. It is advantageous to use these filter aid materials after treatment with the amphoteric metal halide. They may be removed by filtering, settling, and/or centrifuging.

A combination of the treatments mentioned may be employed and the yield, deterging, wetting, emulsifying efficiency, odor and color of the products have been found to be materially improved thereby. Any one of the steps, however, is of importance and contributes toward a better product and may or may not be used with the more general method of sulphonating the metal-halide-treated mineral oil extract in liquid sulphur dioxide to produce materially improved products.

The next step after the pre-treatment of the hydrocarbon extract consists in dissolving it in a solvent comprising liquid sulphur dioxide, or the extract material being already in sulphur dioxide solution from the solvent extraction process, the next step may consist in diluting the solution with as much more liquid sulphur dioxide and/or other solvent as may be necessary to prepare it for the subsequent steps in the process. Usually, the extracted material should be dissolved in approximately one-half to two times its volume of liquid sulphur dioxide to form a very fluid solution.

The solution of extracted material in liquid sulphur dioxide is mixed with a sulphonating agent such as strong fuming sulphuric acid, also preferably dissolved in liquid sulphur dioxide. The temperature is kept below $+5°$ C, during the initial mixing, and preferably below $-5°$ C. Agitation should be applied when using a batch method in order to rapidly dissipate the heat generated to the cooling surfaces of the reaction vessel.

The quantity of acid used, and its strength, will depend on the type of extracted material, the reaction temperature, liquid sulphur dioxide dilution, and the characteristics desired in the finished product. Fuming sulphuric acid (commercial 20% oleum), in a quantity about equal in weight to the extracted material to be treated and dissolved in liquid sulphur dioxide, has been found satisfactory. Sulphur trioxide, chlorsulphonic acid, dioxane-sulphuric acid, inorganic and organic acid-sulphuric acid mixed anhydrides, or other sulphonating agent soluble in liquid sulphur dioxide may also be used. By dissolving the sulphonating agent in liquid sulphur dioxide, it is possible to add this agent to the liquid sulphur dioxide solution of the mineral extract over a much shorter period of time without excessive temperature increase such as would result if the sulphonating agent were added directly to the mineral oil extract solution. Furthermore, it facilitates the reaction and physically permits more rapid dissipation and removal of the heat of reaction. The reaction is carried out at low temperatures which prevent undesired reactions that occur at the higher sulphonation temperatures. Upon completion of the original mixing of acid with the extracted materials and after the initial evolution of heat of reaction has been dissipated, the reacting mixture is raised to a temperature of about +5° C. by control of cooling apparatus. The original mixing is accomplished in a few minutes. The reaction is permitted to continue with agitation for a period not greater than fifteen minutes from the initial mixing of the reactants and preferably no longer than five minutes.

Treatment with the sulphonating agent having been completed, the reaction mixture is diluted with cold water to stop further action of the sulphonating agent. After water dilution the next step is to separate any unreacted mineral hydrocarbon from the mixture. Several alternatives are possible. One is to hold the liquid sulphur dioxide solution of sulphonation products and acid under pressure and add enough water to form two layers. One layer, consisting of the bulk of liquid sulphur dioxide containing most of the unreacted hydrocarbon oil in solution, may be directly separated. The second layer, consisting of the sulphonic-sulphuric acids in aqueous solution, may be further extracted with fresh liquid sulphur dioxide, and after removal of the residual dissolved sulphur dioxide, the aqueous layer may then be neutralized with a basic compound such as caustic soda, soda ash, ammonia, lime, triethanolamine, or the like.

Alternatively, the liquid sulphur dioxide solvent may be evaporated off immediately on dilution of the reaction mixture with water, and the quantity of water may be controlled to give either a dilute solution of sulphonic-sulphuric acids (one phase), or, with a lesser proportion of water, such a concentration of sulphuric acid that a two-phase system results, consisting of an upper layer of sulphonic acids and a lower layer of diluted sulphuric acid. The latter may be withdrawn directly and discarded. The sulphonic acid solution may then be washed with a sodium chloride brine preferably containing dissolved sodium acid sulphate. It is also possible to dialyze the solutions to remove sulphuric acid or salts thereof. The sulphonic acid solution may be washed with an insoluble low-boiling hydrocarbon in order to free it from any unreacted extract that it may contain.

The water solution of the reaction product may or may not be boiled before neutralization to decompose any unstable products present. After neutralization, the solution may be boiled in an excess of caustic soda, or the acid solution may be run into a calculated amount of hot concentrated caustic soda to decompose unstable compounds. The solution of neutralized sulphuric acid reaction product, which may also contain a considerable proportion of the sulphate of the neutralizing material as a result of its reaction with the excess sulphuric acid present, may be used in this state for many purposes, or it may be further concentrated by extracting with ethyl alcohol, isopropyl alcohol, butyl alcohol, or with other solvents in which the active ingredient is soluble, to free it from the by-product sulphate formed in the neutralizing process.

A more detailed understanding of the principles of this invention may be achieved by a consideration of the following specific examples of the process of making the improved compositions.

*Example I*

A distillate from a Texas Gulf Coast crude boiling between 130° C. and 350° C. at 5 mm. pressure and having a Saybolt viscosity of 80 seconds at 100° F., is countercurrently extracted with approximately an equal volume of liquid sulphur dioxide by the usual Edeleanu process, the sulphur dioxide separates from the extract and the extract is then fractionally distilled in vacuum, in the presence of about 0.1% of its weight of caustic soda. The fraction boiling between 220° C. and 240° C. at 5 mm. pressure is dissolved in an equal volume of Skellysolve (gasoline) and is pre-treated with about 5% of its weight of anhydrous tannic chloride by mixing it therewith for about fifteen minutes. A dark layer separates and is removed. The remaining clear solution is washed with water and dried with calcium chloride. The solvent is removed by distillation and the remaining oil is found to be bright and clear. Centrifuging may be employed for separating the two layers.

The pretreated extract is dissolved in an equal volume of liquid sulphur dioxide and cooled to −20° C. Over a period of one minute a liquid sulphur dioxide solution of 20% oleum is added. The quantity of oleum used is about equal in weight to that of the hydrocarbon material to be sulphonated and is dissolved in an equal volume of liquid sulphur dioxide, also cooled to −20° C. The reaction mixture is agitated in a jacketed autoclave provided with stirrer, pressure gauge, thermometer and cooling means. Considerable heat is evolved upon the addition of acid. Temperature control is maintained by circulating a cooling fluid through the jacket. The temperature during mixing is not permitted to rise above +5° C., and is maintained at that point for about ten minutes, the agitation being continued. At the end of this period, ice-water is added and the sulphur dioxide is separated as a vapor, by releasing the pressure at a temperature below +10° C.

The aqueous solution or dispersion is immediately batch-washed several times with 20% of its volume of gasoline, endpoint above 250° F. It is neutralized with caustic soda, and finally dried on soap-drying rolls at a roll temperature of about 250° F.

The above operation yielded a substantially dry powder of good color and having practically no odor either in the dry state or when rubbed to a lather on the hands.

*Example II*

200 parts of the liquid sulphur dioxide extract of a Gulf Coast crude, boiling between about 150° and 260° F. at 2 mm. pressure are heated with 300 parts of water and 100 parts by volume of 10% hydrochloric acid at a temperature of 80° C. Zinc dust is added in small increments until 10 parts have been added, meanwhile agitating the mixture thoroughly. The aqueous layer is separated. The oil is filtered from insoluble matter and dissolved in ether. The ether solution is washed with water, dried and evaporated. The oil is improved in color. The oil is dissolved in about 400 parts by volume of liquid sulphur dioxide. About 200 parts by weight of 20% oleum are then slowly added and the reaction is continued for about one hour at about −10° C. The reaction mixture is poured into ice and water and the solution gently heated to remove the sulphur dioxide. The acid product is neutralized with caustic soda solution. The sulphonate salt solution is ether extracted to remove organic unsaponifiable material and then dried.

200 parts of a furfural extract of a Mid-Continent crude may be similarly treated using zinc dust and 25% sulphuric acid. Another variation is to treat 200 parts of the liquid sulphur dioxide extract with 16 parts by volume of 50% sodium hydroxide solution, 200 parts by volume of water, and 10 parts by weight of aluminum powder with agitating. The oil is dissolved in ether, filtered and washed with water. The solvent is evaporated and the recovered oil is similarly sulphonated and purified to yield a light colored detergent material.

*Example III*

200 parts by weight of a furfural extract of a Mid-Continent crude boiling between about 225° and 360° F. at 2 mm. pressure are dissolved in 600 parts by volume of a petroleum solvent (B. Pt. 35–59° C.). This solution is agitated and 5 parts of stannic chloride dissolved in 25 parts by volume of the hydrocarbon solvent are added to the extract solution. A dark precipitate forms which is removed by filtration. The clear solution is washed with water, dried and solvent evaporated. The yield of refined oil is about 86%. The oil is sulphonated by the procedure given in Example II to yield an excellent detergent sulphonate salt.

*Example IV*

200 parts by weight of a liquid sulphur dioxide high viscosity extract of a California asphaltic base crude, boiling between about 360° and 700° F. at 2 mm., are dissolved in 600 parts by volume of a pentane-hexane solvent mixture. 10 parts of stannic chloride dissolved in 50 parts by volume of the hydrocarbon solvent are added to the extract solution and well agitated. A very dark, heavy precipitate forms and is filtered from the solution. The clear solution is washed with water, dried and the solvent evaporated. The subsequent treatment of the oil is substantially the same as that described in Example II. The products are superior in color and other properties.

*Example V*

200 parts by weight of a distilled liquid sulphur dioxide extract of a Texas Gulf Coast crude boiling between about 335° and 550° F. at 46 mm. pressure, are dissolved in 400 parts by volume of light petroleum ether. To the solution are then added 2 parts by weight of $SnCl_4$ (anhydrous) dissolved in 20 parts by volume of a light petroleum ether. After 15 minutes of agitation at room temperature (70° F.) the precipitate which forms is filtered out of the solution. The filtrate is washed with dilute caustic soda and with water. The solution is dried over $CaCl_2$ and the solvent evaporated on the steam bath. The yield is about 97.5% of extract of improved color and odor. The treated oil is dissolved in about an equal volume of liquid sulphur dioxide and sulphonated at about −10° C. using 100 parts by weight of 20% oleum. The sulphonate product is greatly improved over one similarly prepared but omitting the stannic chloride treatment.

*Example VI*

To 200 parts by weight of a liquid sulphur dioxide extract of a Texas Gulf Coast crude boiling between 140° and 260° F. at 2 mm. pressure are added 2 parts by weight of $SnCl_4$ (anhydrous). The mixture is agitated for about 15 minutes at 70° F. (room temperature). A dark precipitate forms and is filtered out of the oil. The treated oil is sulphonated as in Example V to yield an excellent detergent product.

*Example VII*

100 parts by weight of the extract used in Example II are dissolved in 300 parts by volume of liquid sulphur dioxide. The solution is agitated while adding 1 part by weight of $SnCl_4$ (anhydrous). 100 parts by weight of 20% oleum are slowly added to the solution. After the reaction is complete, the solution is poured into ice and water to form a clear aqueous solution. The sulphur dioxide is removed as a vapor. This acid solution is neutralized with sodium hydroxide (50%). The neutral solution is extracted with ether and the unreacted oil is removed. Excess ether is removed from the aqueous solution by gentle heating. Two parts by weight of filter clay are added and the precipitate is removed by filtration. The precipitate is white and may be used for regenerating the tin salt. The product is an excellent detergent of good physical properties.

*Example VIII*

100 parts by weight of a fraction of a distilled liquid sulphur dioxide extract of a Texas Gulf Coast lubricating oil, which fraction boils between 395° and 405° F. at 8 mm. pressure, are dissolved in about 200 parts by volume of liquid sulphur dioxide. To this solution are slowly added about 33 parts by weight of 20% oleum at −10° C. One part by weight of sodium borofluoride is then added. About 67 additional parts of 20% oleum are then slowly added to the reaction mixture. The total reaction time is approximately 1 hour. The mixture is poured into ice and water and the sulphur dioxide is removed by vaporization with gentle heating. The solution is neutralized with 50% sodium hydroxide solution, extracted with ether and then dried on rolls.

This example may be varied by using other catalysts in place of the sodium borofluoride. For example, 1% stannic chloride anhydrous, 1% stannic chloride $5H_2O$, 1% boric and 1% sodium fluoride, or 1% antimony trichloride may be substituted for the 1% of sodium borofluoride in Example VIII.

It is also possible to pretreat similarly and/or to sulphonate other materials in the presence of an amphoteric element halide alone or along with the preferred material, mineral oil extract, including aromatic, alkylated aromatic and acylated aromatic materials; heterocyclic compounds such as cumarone, furfural, piperidine and pyridine; or various mixtures of these materials.

It has been found that the best results are obtained by the use of stannic chloride as the amphoteric metal halide, but other amphoteric metal halides have been found to be efficacious including zinc chloride, aluminum chloride, aluminum bromide, stannous chloride, stannic bromide, titanium tetrachloride, silicon tetrafluoride, zinc bromide, the other corresponding halides of these metals, and even the more reactive halides such as boron fluoride and boron chloride or mixtures thereof. The complex halides of these metals such as potassium boron fluoride, stannic ammonium chloride, lead ammonium chloride, fluosilicic acid, borofluohydric acid, chlorostannic acid, may be similarly employed. The individual halides entering into the formation of these complex halides may be also used. For example, sodium fluoride, ammonium chloride, potassium bromide, hydrochloric acid and the like may be employed along with the simple amphoteric metal halide. The amphoteric metal halide or its complex may be generated in situ; for example by the reaction between an alkali halide such as sodium fluoride, boric acid or its anhydride or other oxide or hydroxide of an amphoteric metal, and sulphuric acid. In the sulphonation reaction metal halides such as boron fluoride or its complexes react to a certain extent with the sulphonating agent to form borosulphuric acid derivatives which also exert a beneficial effect in the sulphonation reaction. Not only borosulphuric acid but borophosphoric acids or their derivatives may be used in the process of the present invention. It is also possible to pass chlorine through the mixture during the sulphonation reaction.

Other salts of the sulphonate product than the sodium salts, such as those of calicum, potassium, magnesium, ammonium and organic bases, may be prepared either directly or by a base exchange reaction. Examples of suitable organic bases are amines, quaternary ammonium hydroxides and other basic organic nitrogenous substances such as diethylene triamine, triethylene tetramine, ethylene diamine, mono-, di-, and triethanolamine, mono-, di-, and tri-amyl amine, aniline, dimethyl aniline, naphthylamine, tetraethyl ammonium hydroxide, heterocyclic nitrogen derivatives and N alkyl derivatives thereof including pyridine, quinoline, quinaldine, N dodecyl pyridine, etc.

The product can be neutralized in the presence of a large mass of previously neutralized material to prevent excessive rises in the pH value and to absorb the large heat of dilution and neutralization. The products may be rendered free from by-products salt by treatment with ethyl alcohol, butyl alcohol, acetone, carbitol, monoglycerides, cellosolve, dioxane and/or the like. It may also be accomplished by preparing the calcium salt and filtering the product from the insoluble calcium sulphate. The cation of a salt product of the present invention may be interchanged with the cation of an inorganic salt by treating a solution of one or more salts of the organic product in one or more of the above-named solvents with an excess of a concentrated aqueous solution of a salt of that cation which is to be exchanged for the original organic product salt cation. It should be noted that any of the products falling within the scope of the present invention may be neutralized and purified by the above outlined procedure.

The derging, sudsing, and water-softening properties of the new materials may be supplemented by the addition of any of the common auxiliary agents used in soap and detergent compositions. Suitable addition agents are other emulsifying agents including soaps, rosinates, long-chain alcohol sulphates, alkylated aromatic sulphonic acid salts, sulphonated mineral oil extracts, Turkey red oil, lecithin, glycerolamines, monoethanolamines, diethanolamine and triethanolamine; coloring matter such as dyes, lakes, and pigments; abrasives and inert fillers such as silica, pumice, feldspar, precipitated chalk, infusorial earth, bentonite, talc, starch, and air; acids such as boric acid, citric acid and tartaric acid; liquids including carbon tetrachloride, perchlorethylene, trichlorethylene, glycerine, ethyl alcohol, tetrahydrofurfuryl alcohol, phenol, cyclohexanol, water, tetralin, hexalin, pine oil, mineral oil, mineral oil extracts, and naphtha; perfumes and deodorants; fats, oils, fatty acids, monoglycerides, vitamins, waxes, gums, or resins, germicides such as phenol mercury chloride, phenyl mercury nitrate, phenyl mercury chloride, methyl salicylate and mercuric chloride; styptics; any of the common water-soluble salts such as sodium sulphate, chloride, acetate, citrate, tartrate, borate, bicarbonate, sesquicarbonate, hypochlorite, thiosulphate, hydrosulphite, and hyposulphate, or the corresponding ammonium and potassium salts thereof. The type of addition agent to be used, of course, will depend on the ultimate use of the new compositions.

The water-soluble, water-softening compounds of tetraphosphoric, pyrophosphoric or hexametaphosphoric acid and their alkali metal, ammonia and amine salts or alkyl esters may also be added to these compositions.

The final detergent composition with or without one or more addition agents may be formed into beads, flakes, bars, ribbons, chips, crystals, powders, fibres, solutions, liquid or plastic emulsions pastes, creams, salves, or any other forms desired. The ingredients may be mixed by any of the common methods such as grinding, stirring, kneading crutching, fusion, and drying by rolls, spray or otherwise of mixed solutions.

The compositions may be used in washing compositions for wood, metal, stone, glass, brick, masonry and painted surfaces; insecticides; cements; abrasive compositions; antiseptics; water softeners; deodorants and disinfectants; water paints and polishes; sizes, glues and adhesives such as shellac and casein compositions; liquid, solid and paste tooth and mouth detergents; laundry detergents and other textile agents including laundry blueing, bleaching, dyeing, and discharging compositions; depilatories; dust preventing compositions; fire extinguishing compositions; drain, lavatory and radiator cleaners; anti-freezing, anti-fogging, and anti-corrosion compositions; wood impregnants; electrolytic baths; metal pickling and etching compositions; cosmetics, shaving preparations, shampoos and hair wave lotions; fat-liquors for leather; photographic solutions; plasticizers; paint stain and grease removers; dry cleaning compositions; rug cleaners; petroleum de-emulsifying compositions petroleum well-treating compositions; fruit washing; and any compositions requiring wetting washing, emulsifying, penetrating, solubilizing dispersing and like agents.

As many apparently widely different embodiments of this invention may be made without departing from the spirit and scope thereof, it is to be understood that the applicant does not limit himself to the specific proportions or embodiment thereof except as defined in the following claims

I claim:
1. The process which comprises sulphonating an organic compound of the group consisting o compounds of the aromatic and heterocyclic serie with sulphuric acid in the presence of an iner solvent and an amphoteric element halide.

2. The process which comprises sulphonating a mineral oil extract with sulphuric acid in the presence of an inert solvent and an amphoteric element halide.

3. The process of preparing organic sulphonate which comprises treating a mineral oil extract with a sulphonating agent in the presence of an inert solvent and an amphoteric element halide.

4. A process of preparing organic sulphonates which comprises treating a mineral oil extract with stannic chloride and then with a sulphonating agent.

5. A process of producing organic sulphonates which comprises continuously treating a solution of mineral oil extract in a solvent comprising liquid sulphur dioxide with stannic chloride and a sulphonating agent.

6. The process of producing organic detergents which comprises treating a liquid sulphur dioxide extract of mineral oil, while the extract is dissolved in liquid sulphur dioxide, with a sulphonating agent in the presence of stannic chloride.

7. The process which comprises sulphonating an organic compound of the group consisting of compounds of the aromatic and heterocyclic series with sulphuric acid in the presence of an inert solvent and boron trifluoride.

8. A process for producing organic sulphonates which comprises treating a mineral oil extract while dissolved in a solvent comprising liquid sulphur dioxide as the major constituent with a sulphonating agent in the presence of sodium borofluoride.

9. A process for producing organic sulphonates which comprises treating a mineral oil extract while dissolved in a solvent comprising liquid sulphur dioxide as the major constituent with a sulphonating agent in the presence of sodium fluoride and a compound of the class consisting of boric acid and its anhydride.

10. A process for producing organic sulphonates which comprises treating a mineral oil extract with a sulphonating agent in the presence of an inorganic monovalent halide and a boron compound of the class consisting of boric acid and its anhydride.

11. The process of producing organic detergents which comprises treating a liquid sulphur dioxide extract of mineral oil, while the extract is dissolved in liquid sulphur dioxide, with a sulphonating agent in the presence of sodium borofluoride.

12. A process of producing organic sulphonates which comprises treating a mineral oil extract with an amphoteric metal and a hydrohalide acid to partially hydrogenate the extract and to generate an amphoteric metal halide, and then sulphonating the mineral oil extract.

JOSEPH EDWARD MITCHELL.

REFERENCES CITED

The following references are of record in the file of this patent:

UNITED STATES PATENTS

| Number | Name | Date |
| --- | --- | --- |
| 2,061,617 | Downing et al. | Nov. 24, 1936 |
| 2,061,619 | Downing et al. | Nov. 24, 1936 |
| 2,149,661 | Brandt | Mar. 7, 1939 |

OTHER REFERENCES

Calloway, Chemical Reviews, vol. 17, pp. 374 to 377 (1935).